(12) United States Patent
Shimada

(10) Patent No.: US 12,018,146 B2
(45) Date of Patent: Jun. 25, 2024

(54) COMPOSITION FOR WIRE COATING MATERIAL, INSULATED WIRE, AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Tatsuya Shimada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 969 days.

(21) Appl. No.: 16/976,815

(22) PCT Filed: Feb. 27, 2019

(86) PCT No.: PCT/JP2019/007483
§ 371 (c)(1),
(2) Date: Aug. 31, 2020

(87) PCT Pub. No.: WO2019/181398
PCT Pub. Date: Sep. 26, 2019

(65) Prior Publication Data
US 2020/0399459 A1 Dec. 24, 2020

(30) Foreign Application Priority Data
Mar. 20, 2018 (JP) ................. 2018-052721

(51) Int. Cl.
| | | |
|---|---|---|
| C08L 51/06 | (2006.01) | |
| C08F 255/02 | (2006.01) | |
| C08F 287/00 | (2006.01) | |
| C08K 3/016 | (2018.01) | |
| C08K 3/16 | (2006.01) | |
| C08K 3/22 | (2006.01) | |
| C08K 3/30 | (2006.01) | |
| C08K 5/00 | (2006.01) | |
| C08K 5/03 | (2006.01) | |
| C08L 23/00 | (2006.01) | |
| C08L 23/02 | (2006.01) | |
| C08L 23/26 | (2006.01) | |
| H01B 3/44 | (2006.01) | |

(52) U.S. Cl.
CPC ............. *C08L 51/06* (2013.01); *C08K 3/16* (2013.01); *C08K 3/2279* (2013.01); *C08K 2003/2296* (2013.01); *C08K 2003/3009* (2013.01); *C08L 2201/02* (2013.01); *C08L 2203/202* (2013.01); *C08L 2312/08* (2013.01)

(58) Field of Classification Search
None
See application file for complete search history.

(56) References Cited

U.S. PATENT DOCUMENTS

| | | |
|---|---|---|
| 9,951,242 B1 | 4/2018 | Shimada et al. |
| 2010/0163272 A1 | 7/2010 | Inagaki et al. |
| 2011/0056728 A1 | 3/2011 | Shiraki et al. |
| 2012/0273268 A1 | 11/2012 | Shimada et al. |
| 2017/0250002 A1* | 8/2017 | Shimada ............... C08F 255/02 |
| 2018/0268956 A1 | 9/2018 | Shimada |

FOREIGN PATENT DOCUMENTS

| | | | |
|---|---|---|---|
| JP | 2000-212291 A | 8/2000 | |
| JP | 2000-294039 A | 10/2000 | |
| JP | 2008-234883 A | 10/2008 | |
| JP | 2010-174157 A | 8/2010 | |
| JP | 2011-168697 A | 9/2011 | |
| JP | 2015-193689 A | 11/2015 | |
| JP | 2015193689 A | * 11/2015 | |
| JP | 2016-181413 A | 10/2016 | |
| JP | 2017-174551 A | 9/2017 | |

(Continued)

OTHER PUBLICATIONS

Oct. 9, 2022 Office Action issued in Chinese Patent Application No. 201980016774.4.

(Continued)

*Primary Examiner* — Randy P Gulakowski
*Assistant Examiner* — Ha S Nguyen
(74) *Attorney, Agent, or Firm* — Oliff PLC

(57) ABSTRACT

A composition for a wire coating material containing a silane-crosslinked polyolefin which is excellent in flame-retardancy, fusion resistance, and heat-deformation resistance, and an insulated wire and a wiring harness coating the composition. A composition for a wire coating material contains (A) a silane-grafted polyolefin which is a polyolefin graft-modified with a silane coupling agent, (B) an unmodified polyolefin, (C) a modified polyolefin having one or more functional groups selected from the group consisting of a carboxy group, an ester group, an acid anhydride group, an amino group, and an epoxy group, (D) a flame retardant, and (E) a crosslinking catalyst. The polyolefin of (A) the silane-grafted polyolefin has a density of 0.855 to 0.890 $g/cm^3$ in an ungrafted state and has a melting point of 80° C. or higher, and the unmodified polyolefin has a density of 0.855 to 0.950 $g/cm^3$.

9 Claims, No Drawings

(56) References Cited

FOREIGN PATENT DOCUMENTS

| | | | |
|---|---|---|---|
| JP | 2018-154679 A | 10/2018 | |
| WO | 2009/008537 A1 | 1/2009 | |
| WO | WO-2016027651 A1 * | 2/2016 | ............ C08F 255/02 |
| WO | 2016/084613 A1 | 6/2016 | |
| WO | 2016/175076 A1 | 11/2016 | |

OTHER PUBLICATIONS

May 7, 2019 International Search Report issued in International Patent Application No. PCT/JP2019/007483.
Mar. 1, 2022 Office Action issued in German Application No. 11 2019 001 430.7.
Dow, "INFUSETM 9107 Olefin Block Copolymer", Technical Data Sheet, pp. 1-2, Aug. 12, 2008.
Dow, "INFUSETM 9100 Olefin Block Copolymer", Technical Data Sheet, pp. 1-2, Aug. 12, 2008.
Lyondellbasell, "Adflex C 200 F", Technical Data Sheet, pp. 1-2, Feb. 18, 2022.

* cited by examiner

COMPOSITION FOR WIRE COATING MATERIAL, INSULATED WIRE, AND WIRING HARNESS

TECHNICAL FIELD

The present invention relates to a composition for a wire coating material, an insulated wire, and a wiring harness.

BACKGROUND ART

Insulated wires used in automobiles are sometimes used in places that is subjected to high temperatures around such as an engine, so that high heat resistance is required for the wires. A crosslinked polyvinyl chloride resin and a crosslinked polyolefin resin have been conventionally used as coating materials for these insulated wires. As methods for crosslinking these resins, methods of crosslinking with an electron irradiation (see Patent Literature 1) and silane crosslinking (see Patent Literature 2) are known.

CITATION LIST

Patent Literature

Patent Literature 1: JP 2000-294039 A
Patent Literature 2: JP 2000-212291 A

SUMMARY OF INVENTION

Problems to be Solved by the Invention

Silane crosslinking, which is also referred to as water crosslinking, is promoted by moisture in the air. Thus, a method of batching and mixing of each of a silane modified resin, a crosslinking catalyst, and other components has been taken to prevent progress of the unintended crosslinking reactions and production of a partially cured products. Since the crosslinking catalyst and the other components are add to an uncrosslinked resin, there has been a concern about decrease of a crosslinking degree of the entire resin, heat resistance, and mechanical properties.

In recent years, with the spread of hybrid automobiles, an electric wire capable of adapting to high voltage and high current has been required, so that many electric wires having large diameters have been used. Insulted electric wires with large diameters need flexibility of the coating materials from a viewpoint of ensuring assembly workability. However, when the coating materials are made flexible, pellets of raw materials and uncrosslinked insulated wires may be fused and the coating materials of an electric wires may be deformed on heating.

It is an object of the present invention to provide a composition for a wire coating material containing a silane-crosslinked polyolefin which is excellent in flame-retardancy, fusion resistance, and heat-deformation resistance, and an insulated wire and a wiring harness containing the composition.

Solution to Problem

A composition for a wire coating material according to an embodiment of the present invention contains (A) a silane-grafted polyolefin which is a polyolefin graft-modified with a silane coupling agent, (B) an unmodified polyolefin, (C) a modified polyolefin having one or more functional groups selected from the group consisting of a carboxy group, an ester group, an acid anhydride group, an amino group, and an epoxy group, (D) a flame retardant, (E) a crosslinking catalyst. The polyolefin of (A) the silane-grafted polyolefin in an ungrafted state has a density of 0.855 to 0.890 g/cm$^3$ and a melting point of 80° C. or higher, and (B) an unmodified polyolefin has a density of 0.855 to 0.950 g/cm$^3$.

It is preferable that the polyolefin of (A) the silane-grafted polyolefin in the ungrafted state has a density of 0.865 to 0.880 g/cm$^3$, a melt flow rate of 0.5 to 5 g/10 min. at 190° C. under a load of 2.16 kg, a Shore A hardness of 55 to 70, a flexural modulus of 3 to 50 MPa, and a melting point of 100° C. or higher, and (B) the unmodified polyolefin has a melt flow rate of 0.5 to 5 g/10 min. at 190° C. under a load of 2.16 kg, a flexural modulus of 3 to 200 MPa, and a melting point 65° C. or higher.

It is preferable that the amount of (A) the silane-grafted polyolefin is 30 to 90 parts by mass, the total amount of (B) the unmodified polyolefin and (C) the modified polyolefin is 10 to 70 parts by mass, (D) the flame retardant contains, with respect to 100 parts by mass of the total amount of the components (A), (B), and (C), either one of (D-1) 10 to 100 parts by mass of a metal hydroxide and (D-2) 10 to 40 parts by mass of a bromine flame retardant and 5 to 20 parts by mass of antimony trioxide, and the amount of component (E) the crosslinking catalyst is 0.01 to 1 parts by mass with respect to 100 parts by mass of the total amount of the components (A), (B), and (C).

It is further preferable that the composition contains, with respect to 100 parts by mass of the total amount of the components (A), (B), and (C), 1 to 10 parts by mass of (F) an antioxidant, 1 to 10 parts by mass of (G) a metal deactivator, and 1 to 10 parts by mass of (H) a lubricant.

It is further preferable that the composition further contains, with respect to 100 parts by mass of the total amount of the components (A), (B), and (C), either one of (I-1) 1 to 15 parts by mass of zinc oxide and an imidazole compound, and (I-2) 1 to 15 parts by mass of zinc sulfide.

It is preferable that each of the polyolefin constituting (A) the silane-grafted polyolefin and (B) the unmodified polyolefin is one or more selected from the group consisting of an ultra-low-density polyethylene, a linear-low-density polyethylene, and a low-density polyethylene.

An insulated wire according to the present invention contains a crosslinked product of the above composition for a wire coating material.

A wiring harness according to the present invention contains the above insulated wire.

Advantageous Effects of Invention

The composition for a wire coating material according to the embodiment of the present invention is a composition which contains a silane-grafted polyolefin composition which has excellent flexibility, fusion resistance, and heat-deformation resistance as well as excellence flame retardancy.

Generally, a polyolefin having a lower density has higher flexibility, but tends to have a lower melting point. Thus, it is difficult to achieve fusion resistance and heat-deformation resistance at the same time with flexibility. The insulated wire according to the embodiment of the present invention has excellent flexibility, fusion resistance, and heat-deformation resistance by containing components having densities and a melting points set within appropriate ranges.

DESCRIPTION OF EMBODIMENTS

Next, a preferred embodiment of the present invention is to be described in detail.

The composition for a wire coating material (hereinafter sometimes referred to as the present protection composition) contains (A) a silane-grafted polyolefin, (B) an unmodified polyolefin, (C) a modified polyolefin, (D) a flame retardant, and (E) a crosslinking catalyst. Further, the present composition preferably contains (F) an antioxidant, (G) a metal deactivator, (H) a lubricant, and (I) a zinc-based stabilizer. Each component is to be described in detail as below.

(A) A silane-grafted polyolefin is obtained by introduction of a silane-grafted chain into a polyolefin serving as a main chain by graft-modification with a silane coupling agent.

(A) The silane-grafted polyolefin preferably has a density of 0.855 to 0.890 g/cm$^3$, more preferably a density of 0.860 to 0.885 g/cm$^3$, even more preferably a density of 0.865 to 0.880 g/cm$^3$. The polyolefin which has a lower density can be grafted with a silane-coupling agent more easily and has higher flexibility. If the density of the polyolefin is lower than 0.855 g/cm$^3$, however, the melting point could be too low, whereby pellets of materials and a molded product before crosslinking could cause fusion and be deformed by heating. Further, heat resistance and wear resistance of the wire could be low, and a resin could be too soft, which might decrease kneadability of the resin. On the other hand, if the density of the polyolefin is higher than 0.890 g/cm$^3$, a grafting rate, crosslink density, and flexibility could be low. The density of the polyolefin can be measured in accordance with ASTM D790.

The present composition can be crosslinked by exposition to steam. From a viewpoint of preventing fusion between molded products, the melting point of the polyolefin constituting the silane-grafted polyolefin is preferably 80° C. or higher, more preferably 100° C. or higher, and even more preferably 120° C. or higher. If a melting point of polyolefin is lower than 80° C., pellets of materials and a molded product before crosslinking could cause fusion and be deformed by heating. An upper limit of the melting point is not particularly defined. When a polyolefin has excellent characteristics such as flexibility, the melting point of the polyolefin is 135° C. or lower in many cases. The melting point of a polyolefin can be measured in accordance with JIS K7121.

Generally, a polyolefin having more and longer branched chains in the polymer chain has a lower density and higher flexibility. On the other hand, such a polyolefin has a lower melting point. A polyolefin which has both more crystalline parts and less crystalline parts serves as a polyolefin having appropriate density and melting point. The more crystalline parts contain fewer branched chains and have a highly dense structure while the less crystalline parts contain more long branched chains and have a low-density structure. Such a polyolefin can thus have satisfactory fusion resistance and heat-deformation resistance while maintaining flexibility.

The polyolefin composing (A) the silane-grafted polyolefin preferably has a melt flow rate (hereinafter sometimes referred to as "MFR") of 0.5 to 5 g/10 min. and more preferably of 1.0 to 3.0 g/10 min., at 190° C. under a load of 2.16 kg. When the polyolefin has MFR of 0.5 g/10 min. or higher, the polyolefin has excellent extrusion molding property and thus provides excellent productivity. On the other hand, when the polyolefin has MFR of 5 g/10 min. or lower, the polyolefin effectively maintains a certain form in molding and thus provides excellent productivity. The MFR of a polyolefin can be measured in accordance with ASTM D1238.

The polyolefin composing (A) the silane-grafted polyolefin preferably has a Shore A hardness of 55 to 70. Further, the polyolefin composing (A) the silane grafted polyolefin preferably has a flexural modulus of 3 to 50 MPa. When both the Shore A hardness and the flexural modulus are within the above-mentioned ranges, the polyolefin has excellent flexibility and mechanical characteristics like wear resistance. A Shore A hardness can be measured in accordance with ASTM D2240, and a flexural module can be measured in accordance with ASTM D790.

Examples of the polyolefin used to prepare (A) the silane-grafted polyolefin include homopolymers of ethylene and propylene, and a copolymer of ethylene or propylene and an α-olefin. These may be used alone, or two or more of them may be used in combination. It is preferable to use at least one selected from polyethylene, polypropylene, ethylene-butene copolymer, and ethylene-octene copolymer.

As the above-described polyethylene, it is preferable to use a low-density polyethylene (LDPE), a linear-low-density polyethylene (LLDPE), an ultra-low-density polyethylene (VLDPE), and a metallocene low-density polyethylene. These may be used alone, or two or more of them may be used in combination. When these low-density polyethylenes are used, the flexibility of the electric wire is particularly excellent, and the extrusion productivity is improved.

Further, as the above-described polyolefin, a polyolefin elastomer based on an olefin may be used. When a polyolefin elastomer is used, flexibility can be imparted to the covering material. Examples of the polyolefin elastomer include a polyolefin-based thermoplastic elastomer (TPO) such as a polyethylene-based elastomer (PE elastomer) and a polypropylene-based elastomer (PP elastomer), an ethylene-propylene rubber (EPM or EPR), an ethylene-propylene-diene copolymer (EPDM or EPT).

A silane coupling agent used for preparation of (A) the silane-grafted polyolefin is not particularly limited. Examples of the agent include vinylalkoxysilanes such as vinyltrimethoxysilane, vinyltriethoxysilane, and vinyltributoxysilane, vinyltriacetoxysilane, γ-methacryloxypropyltrimethoxysilane, and γ-methacryloxypropylmethyldimethoxysilane. These may be used alone, or two more of them may be used in combination.

From a viewpoint of preventing excessive crosslinking reaction, the graft amount of the silane coupling agent is preferably 15 mass % or smaller, more preferably 10 mass % or smaller and even more preferably 5 mass % or smaller. On the other hand, the graft amount of the silane coupling agent is preferably 0.1 mass % or larger, more preferably 1.0 mass % or larger, and even more preferably 1.5 mass % or larger. When the graft amount of the silane coupling agent is 0.1 mass % or larger, the present composition is sufficiently crosslinked and provides a wire coating material having excellent heat resistance and mechanical strength through crosslinking. Here, the graft amount represents a percentage of the mass of the grafted silane coupling agent with respect to the mass of the polyolefin before silane-grafting.

When (A) the silane-grafted polyolefin is crosslinked by the crosslinking catalyst, the silane-grafted polyolefin preferably exhibits a gel fraction of 85 mass % or more, and more preferably 90 mass % or more. When the gel fraction is 85 mass % or more, the present composition sufficiently is crosslinked and shows excellent heat resistance and mechanical strength when crosslinked.

The gel fraction of the above-described silane-grafted polyolefin is, for example, obtained by a measurement method described below.

A material obtained by adding 0.5 parts by mass of the crosslinking catalyst to 100 parts by mass of the silane-grafted polyolefin is mixed at 200° C. for 5 minutes and the obtained mass-like substance is subjected to compression pressing at 200° C. for 3 minutes to mold the material into a sheet having a thickness of 1 mm. After the obtained molded sheet is crosslinked in a thermostat bath at 60° C. and 95% humidity for 12 hours, and then the sheet is dried at room temperature.

A test piece having a weight of about 0.1 g is taken from the obtained molded sheet, and then the test piece is immersed in a xylene solvent at 120° C. Then, the test piece is taken out of the solvent after 20 hours, and dried. The dried test piece is weighed. The mass of the test piece after immersion in xylene expressed in percentage with respect to the mass before immersion in xylene is defined as the gel fraction. When a substance other than the silane-grafted polyolefin is contained in the crosslinked product before and after the immersion of the test piece in xylene, the gel fraction of the silane-grafted polyolefin can be calculated by removing the mass of the other substance. For example, the crosslinking catalyst is assumed to be contained in the crosslinked product even after immersion in xylene, and, as described below, when the crosslinking catalyst is diluted with a binder resin, which is a non-crosslinking component, the gel fraction may be calculated on the assumption that the whole amount of the binder resin is eluted in xylene after immersion in xylene.

(A) The silane-grafted polyolefin can be prepared by adding a free radical generating agent to a polyolefin and a silane coupling agent, and mixing the material with a twin-screw extrusion kneader or single screw extrusion kneader, for example. Alternatively, a method where a silane coupling agent is added when a polyolefin is prepared through polymerization may be used.

At this time, the material preferably contains the silane coupling agent in an amount of 0.5 to 5 parts by mass with respect to 100 parts by mass of the polyolefin, and more preferably in an amount of 3 to 5 parts by mass. When the amount of the silane coupling agent is 0.5 parts by mass or larger, the polyolefin is grafted with the agent sufficiently. On the other hand, when the amount of the silane coupling agent is 5 parts by mass or smaller, a crosslinking reaction does not proceed excessively during mixing, whereby the formation of gel-like substances is suppressed, and excellent productivity and workability are achieved.

Examples of the free radical generating agent include organic peroxides such as dicumyl peroxide (DCP), benzoyl peroxide, dichlorobenzoyl peroxide, di-tert-butyl peroxide, butyl peracetate, tert-butyl perbenzoate, and 2,5-dimethyl-2,5-di(tert-butyl peroxide) hexane. Dicumyl peroxide (DCP) is preferable as the free radical generating agent.

When dicumyl peroxide (DCP) is used as the free radical generating agent, a mixing temperature when the polyolefin is graft-modified with the silane coupling agent is preferably set to 120° C. or higher.

The free radical generating agent is preferably used in an amount of 0.025 to 0.1 parts by mass with respect to 100 parts by mass of the polyolefin to be silane-grafted. When the amount of the free radical generating agent is 0.025 parts by mass or larger, a grafting reaction proceeds sufficiently. On the other hand, when the amount of the free radical generating agent is 0.1 parts by mass or smaller, progress of excessive grafting reaction is suppressed to proceed, and the target silane-grafted polyolefin is sufficiently obtained.

The free radical generating agent may be added to the materials in the form diluted with an inert substance such as talc or calcium carbonate or in the form of a pellet in which the agent is diluted with a polymer such as an ethylene propylene rubber, an ethylene propylene diene rubber, and polyolefin.

(B) An unmodified polyolefin is a polyolefin consisting of a hydrocarbon to which a modifying group is not introduced by graft polymerization or copolymerization, for example. Specific examples of the component (B) include homopolymers of ethylene and propylene and a copolymer of ethylene or propylene and α-olefin. These may be used alone or two or more of them may be used in combination. It is preferable to use at least one selected from polyethylene, polypropylene, ethylene-butene copolymer, and ethylene-octene copolymer.

It is preferable to use, as the polyethylene, the low-density polyethylene (LDPE), the linear-low-density polyethylene (LLDPE), the ultra-low-density polyethylene (VLDPE), the metallocene low-density polyethylene. These may be used alone or in combination. Containing these low-density polyethylenes, the electric wire has especially excellent flexibility and extrusion productivity.

Further, an olefin-based polyolefin elastomer may be used as (B) the unmodified polyolefin. Using a polyolefin elastomer provides the coating materials with flexibility. Examples of the polyolefin elastomer include a polyolefin-based thermoplastic elastomer (TPO) such as a polyethylene-based elastomer (PE elastomer) and a polypropylene-based elastomer (PP elastomer), an ethylene-propylene rubber (EPM or EPR), and an ethylene-propylene-diene copolymer (EPDM or EPT).

(B) The unmodified polyolefin may be the same as or different from the polyolefin used for the main chain of (A) the silane-grafted polyolefin. Using the same type of polyolefin provide excellent compatibility.

(B) The unmodified polyolefin has a density of 0.855 to 0.950 g/cm$^3$, and more preferably a density of 0.860 to 0.940 g/cm$^3$. If the density of the unmodified polyolefin is lower than 0.855 g/cm$^3$, the melting point could tend to be excessively low, and the pellets and molded product before crosslinked could easily cause fusion, which leads to deformation by heating. Further, the resin could be too soft to maintain sufficient kneadability. On the other hand, if the density of (B) the unmodified polyolefin exceeds 0.950 g/cm$^3$, the flexibility could be low.

The melting point of (B) the unmodified polyolefin is preferably 65° C. or higher, more preferably 80° C. or higher, and even more preferably 100° C. or higher. When the melting point of (B) the unmodified polyolefin is 65° C. or higher, the component (B) has excellent fusion resistance and heat-deformation resistance. When a polyolefin having a sufficiently high melting point is used as the polyolefin constituting (A) the silane-grafted polyolefin as a crosslinkable component, the melting point of (B) the unmodified polyolefin can be lower than that of the polyolefin constituting (A) the silane-grafted polyolefin. The melting point of a polyolefin can be measured in accordance with JIS K7121.

MFR of (B) the unmodified polyolefin is preferably within a range of 0.5 to 5.0 g/10 min., and more preferably within a range of 1.0 to 3.0 g/10 min. When the MFR is 0.5 g/10 min. or higher, the composition has excellent extrusion molding property and improved productivity. On the other hand, when the MFR is 5 g/10 min. or lower, a resin shape is effectively maintained and the composition has improved productivity. The MFR can be measured in accordance with ASTM D1238.

The flexural modulus of the unmodified polyolefin is preferably within a range of 3 to 200 MPa, and more preferably within a range of 10 to 100 MPa. When the flexural modulus is within the range described above, the composition has excellent flexibility. The flexural modulus can be measured in accordance with ASTM D790.

(C) A modified polyolefin has one or more functional groups selected from the group consisting of a carboxy group, an ester group, an acid anhydride group, an amino group, and an epoxy group. In (C) the modified polyolefin, a functional group may be introduced by graft-polymerization of polymerizable compound having the above-described functional group onto an unmodified base polyolefin composed of one or more α-olefins, or by copolymerization of a polymerizable compound having the above-described functional group and an olefin polymerizable with the polymerizable compound. It should be noted that a polyolefin modified with a silanol derivative such as methcryloxyalkylsilane is not classified as (C) the modified polyolefin, but it is classified as (A) the silane-grafted polyolefin.

Since (C) the modified polyolefin has one or more functional groups selected from the group consisting of a carboxy group, an ester group, an acid anhydride group, an amino group, and an epoxy group, the component (C) has a high interaction with an inorganic component. Further, since the component (C) has a polyolefin chain, the component (C) has high interaction with the resin component such as (A) the silane-grafted polyolefin and (B) the unmodified polyolefin. Thus, (C) the modified polyolefin can be used as a compatibilizer between the resin component and the inorganic component, and provides excellent dispersibility and adhesiveness to the inorganic component.

A polymerizable compound having a carboxy group is not particularly limited as long as the polymerizable compound has a carboxy group and a polymerizable group such as a carbon-carbon double bond in a molecule. Examples of the polymerizable compound include acrylic acid, methacrylic acid, crotonic acid, α-chloroacrylic acid, itaconic acid, butenetricarboxylic acid, maleic acid, fumaric acid, and derivatives containing these as parts of the molecular structures. When the acid forms an acid anhydride, an acid anhydride group can be introduced by the acid hydride.

A polymerizable compound having an ester group may be an ester compound obtained by a reaction of the above-described polymerizable compound having a carboxy group with an alcohol. Alternatively, the ester compound may be obtained by a reaction of an alcohol having a carbon-carbon double bond with any carboxylic acid. Examples of the compound having an ester group include vinyl acetate and vinyl propionate.

A polymerizable compound having an amino group is not particularly limited as long as the polymerizable compound has a polymerizable group such as a carbon-carbon double bond and an amino group in a molecule. Example of the polymerizable compound having an amino group include esters obtained by a reaction between above-described polymerizable compounds having the carboxy group with an alkanolamine, and other compound such as vinylamine and allylamine, and derivatives containing these as part of the molecular structures.

A polymerizable compound having an epoxy group is not particularly limited as long as the polymerizable compound has a polymerizable group such as a carbon-carbon double bond and an epoxy group in a molecule. Examples of the polymerizable compound having an epoxy group include acid glycidyl esters obtained by a reaction between above-described polymerizable compounds having a carboxy group with glycidyl alcohol, glycidyl ethers such as vinyl glycidyl ether, allyl glycidyl ether, glycidyl oxyethyl vinyl ether, and styrene-p-glycidyl ether, and p-glycidyl styrene, and derivatives containing these as parts of the molecular structures.

A polymerizable monomer copolymerizable with the above-described polymerizable compound containing the functional group is not particularly limited as long as the monomer has a polymerizable group such as a carbon-carbon double bond. For example, an olefin monomer can be used which does not have a functional group such as ethylene and propylene, or a polymerizable monomer can be used which has a functional group other than a carboxy group and an epoxy group. They may be used alone or in combination.

The present composition preferably contains (C) the modified polyolefin, with respect to 100 parts by mass of the total amount of the components (A), (B), and (C), in an amount of 3 to 15 parts by mass, and more preferably contains in an amount of 4 to 10 parts by mass. When the present composition contains (C) the modified polyolefin in an amount of 3 parts by mass or more, the present composition has a high affinity between the resin component and the inorganic component.

As for the content ratio of the above-described resin components (A), (B), and (C), the present composition preferably contains (A) the silane-grafted polyolefin in an amount of 30 to 90 parts by mass, and (B) the unmodified polyolefin and (C) the modified polyolefin in an amount of 10 to 70 parts by mass in total, with respect to 100 parts by mass of the total amount of the components (A), (B), and (C). When the present composition contains the resin components within the above-described ranges, the present composition has excellent flexibility, and sufficient crosslinking density. The sufficient crosslinking density results in excellent heat resistance, and wear resistance.

Examples of (D) a flame retardant include a metal hydroxide and a bromine flame retardant. The metal hydroxide can impart flame retardancy alone, while the bromine flame retardant is improved in flame retardancy when used together with antimony trioxide as a flame retardant aid. The metal hydroxide flame retardant or the bromine flame retardant may be used as (D) the flame retardant each alone, or these may be used in combination. As the flame retardant, the metal hydroxide is preferable due to low cost and excellent heat deformation resistance thereof.

Examples of the metal hydroxide include magnesium hydroxide, aluminum hydroxide, and zirconium hydroxide. In the above described materials, magnesium hydroxide is preferable due to low cost and excellent heat deformation resistance. The magnesium hydroxide may be obtained by chemical synthesis or by crushing of natural minerals.

The metal hydroxide preferably has an average particle size of 0.1 to 10 μm and more preferably of 0.5 to 5 μm. When the average particle size of the metal hydroxide is 0.1 μm or larger, aggregation of the particles is hard to occur, while when the average particle size is 10 μm or smaller, the particles of the metal hydroxide are easily dispersed. Further, the metal hydroxide may be treated to improve dispersibility with a surface treatment agent such as a silane coupling agent, a higher fatty acid, and a polyolefin wax. In the embodiment of the present invention, the metal hydroxide compound has excellent dispersibility without the surface treatment since the present composition contains (C) the modified polyolefin.

Examples of the bromine flame retardant include bromine flame retardants having a phthalimide structure, such as ethylene bistetrabromophthalimide and ethylene bistribromophthalimide, ethylene bispentabromophenyl, tetrabromobisphenol A (TBBA), hexabromocyclododecane (HBCD), TBBA-carbonate oligomer, TBBA-epoxy oligomer, brominated polystyrene, TBBA-bisdibromopropyl ether, poly(dibromopropyl ether), and hexabromobenzene (HBB). These may be used alone or two or more of them may be used in combination. Because of high melting point and excellent heat resistance, it is preferable to use at least one or more selected from the phthalimide flame retardant, ethylene bispentabromophenyl or its derivatives.

Antimony trioxide, which is a flame-retardant aid, improves flame retardancy when used with the bromine flame retardant together. It is preferable to use antimony trioxide having a purity of 99% or higher. The antimony trioxide is produced as a mineral. The mineral may be crushed and micronized to use as the flame retardant aid. The antimony trioxide preferably has an average particle size of 3 μm or smaller, and more preferably 1 μm or smaller. When the average particle size of the antimony trioxide is 3 μm or smaller, the particles have excellent interface strength with resins. Further, to improve dispersibility, the antimony trioxide may be treated with a surface treatment agent, such as a silane coupling agent, a higher fatty acid, and a polyolefin wax.

When the metal hydroxide is used alone, the metal hydroxide is preferably contained in an amount within a range of 10 to 100 parts by mass with respect to 100 parts by mass of the total amount of the resin components (A), (B), and (C). When the metal hydroxide is contained in an amount of 10 parts by mass or more, the present composition has excellent flame retardancy. On the other hand, when the metal hydroxide is contained in an amount of more than 100 parts by mass, flame retardancy can not be expected to be improved further. From this viewpoint and from the viewpoint of excellence in flexibility, the upper limit of the amount of the flame retardant is preferably 100 parts by mass.

When the bromine flame retardant and the inorganic flame retardant aid are used together as the flame retardant component, the content ratio of the bromine flame retardant to the inorganic flame retardant aid (the bromine flame retardant:the inorganic flame retardant) is preferably within a range of 3:1 to 2:1, at a stoichiometric ratio.

When the bromine flame retardant and the inorganic flame retardant aid is used as the flame retardant, the bromine flame retardant is preferably contained within a range of 10 to 40 parts by mass, and the antimony trioxide is contained in an amount within a range of 5 to 20 parts by mass with respect to 100 parts by mass of the total amount of the resin components (A), (B), and (C). When the bromine flame retardant is contained in an amount of 10 parts by mass or more, the present composition has excellent flame retardancy. On the other hand, the bromine flame retardant is contained in an amount of more than 40 parts by mass, the flame retardancy can not be expected to be improved further. From this view point and the viewpoint of excellence in flexibility, the upper limit of the amount of the bromine flame retardant is preferably 100 parts by mass.

When the metal hydroxide and the bromine flame retardant is used as the flame retardant together, each of their amounts added can be decreased. Specifically, with respect to 100 parts by mass of the total amount of the resin components (A), (B), and (C), it is preferable that the metal hydroxide is contained in an amount within a range of 10 to 50 parts by mass, the bromine flame retardant is contained in an amount within a range of 5 to 20 parts by mass, and the antimony trioxide is contained in an amount within a range of 5 to 20 parts by mass.

(E) A crosslinking catalyst is a silanol condensation catalyst to silane-crosslink (A) the silane-grafted polyolefin. Examples of the crosslinking catalyst include carboxylate of metals such as tin, zinc, iron, lead, and cobalt, titanate esters, organic bases, inorganic acids, and organic acids. Specific examples include dibutyltin dilaurate, dibutyltin dimaleate, dibutyltin bisisooctylthioglycol ester salt, dibutyltin β-mercaptopropionate, dibutyltin diacetate, dioctyltin dilaurate, stannous acetate, stannous caprylate, lead naphthenate, cobalt naphthenate, barium stearate, calcium stearate, tetrabutyl titanate, tetranonyl titanate, dibutylamine, hexylamine, pyridine, sulfuric acid, hydrochloric acid, toluenesulfonic acid, acetic acid, stearic acid, and maleic acid. The crosslinking catalyst preferably contains dibutyltin dilaurate, dibutyltin dimaleate, dibutyltin bisisooctylthioglycol ester salt, or dibutyltin β-mercaptopropionate.

When (E) the crosslinking catalyst is mixed with (A) the silane-grafted polyolefin, a crosslinking reaction proceeds. Thus, the crosslinking catalyst is preferably mixed immediately before an electric wire is coated with the composition. To improve dispersibility of the crosslinking catalyst, the crosslinking catalyst is preferably mixed with a binder resin in advance and prepared in the form of a crosslinking batch. When the crosslinking catalyst is prepared in the form of a crosslinking batch, unexpected crosslinking reaction of (A) the silane-grafted polyolefin can be prevented. Then, the crosslinking catalyst has excellent dispersibility and sufficiently promotes the crosslinking reaction. Further, when the crosslinking catalyst is used as the crosslinking catalyst batch, it is easy to control the adding amount of the crosslinking catalyst.

The binder resin used to prepare the crosslinking catalyst batch can be the polyolefins used as above-mentioned (A) to (C). Particularly, low-density polyethylene (LDPE), linear-low-density polyethylene (LLDPE), ultra-low-density polyethylene (VLDPE) and metallocene low-density polyethylene are preferably used. When these low-density polyethylenes are used, the electric wire has favorable flexibility and excellent extrudability, and the productivity can be improved. For example, a part of (B) the unmodified polyolefin can be used as the binder resin.

The crosslinking catalyst batch preferably contains the crosslinking catalyst in an amount of 0.5 to 5 parts by mass with respect to 100 parts by mass of the binder resin, and more preferably in an amount of 1 to 5 parts by mass. When the batch contains the crosslinking catalyst in an amount of 0.5 parts by mass or larger, the crosslinking reaction easily proceeds. On the other hand, when the batch contains the catalyst in an amount of 5 parts by mass or smaller, the catalyst has excellent dispersibility.

The present composition preferably contains (E) the crosslinking catalyst in an amount of 0.01 to 1.0 parts by mass, and more preferably in an amount of 0.02 to 0.9 parts by mass with respect to 100 parts by mass of the total amount of the resin components (A), (B), and (C). When the present composition contains the catalyst in an amount of 0.01 parts by mass or larger, the crosslinking reaction can easily proceed. On the other hand, when the present composition contains the catalyst in an amount of 1.0 parts by mass or smaller, excessive crosslinking reaction can be prevented.

(F) The antioxidant is preferably a hindered phenol-based flame retardant, and particularly preferably a hindered phenol having a melting point of 200° C. or higher. Examples of the hindered phenol-based antioxidant include pentaerythritol tetrakis[3-(3,5-di-tert-butyl-4-hydroxyphenyl) propionate], thiodiethylenebis[3-(3,5-di-tert-butyl-4-hydroxyphenyl)propionate], octadecyl-3-(3,5-di-tert-butyl-4-hydroxyphenyl)propionate, N,N'-(hexane-1,6-diyl)bis[3-(3,5-di-tert-butyl)-4-hydroxyphenyl)propionamide], 2,4-dimethyl-6-(1-methylpentadecyl)phenol, diethyl[[3,5-bis(1,1-dimethylethyl)-4-hydroxyphenyl]methyl] Phosphonate, 3,3',3",5,5',5"-hexa-tert-butyl-a,a',a"-(mesitylene-2,4,6-tolyl)tri-p-cresol, calcium diethyl bis[[[3,5-bis(1,1-dimethylethyl)-4-hydroxyphenyl]methyl]phosphonate], 4,6-bis(octylthiomethyl)-o-cresol, ethylene bis(oxyethylene) bis[3-(5-tert-butyl-4-hydroxy-m-tolyl)propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl)methyl]-1,3,5-triazine-2,4,6 (1H, 3H,5H)-trione, 2,6-tert-butyl-4-(4,6-bis(octylthio)-1,3,5-triazin-2-ylamino)phenol, 2,6-di-tert-butyl-4-methylphenol, 2,2'-methylenebis (4-methyl-6-tert-butylphenol), 4,4'-butylidenebis(3-methyl-6-tert-butylphenol), 4,4'-thiobis(3-methyl-6-tert-butylphenol), 3, 9-bis[2-(3-(3-tert-butyl-4-hydroxy-5-methylphenyl)-propynoki)-1,1-dimethylethyl]-2,4,8,10-tetraoxaspiro(5,5) undecane. These may be used alone or two or more of them may be used in combination. Examples of the hindered phenol based antioxidant having a melting point of 200° C. or higher include 3,3',3",5,5',5"-hexa-tert-butyl-a,a',a"-(mesitylene-2,4,6-tolyl)tri-p-cresol, and 1,3,5-Tris(3,5-di-tert-butyl-4-hydroxybenzyl)-1,3,5-triazine-2,4,6(1H,3H,5H)-trione.

The present composition preferably contains (F) the antioxidant in an amount of 1 to 10 parts by mass, and more preferably in an amount of 1 to 5 parts by mass, with respect to 100 parts by mass of the total amount of the resin components (A), (B), and (C). When the amount is within the above-described range, the present composition has excellent antioxidant property and is suppressed to cause blooming.

(G) A metal deactivator can be a copper deactivator or a chelating agent, which can prevent the oxidation caused by a contact with a heavy metal such as copper. Examples of the metal deactivator include hydrazide derivatives such as 2,3-bis[3-(3,5-ditert-butyl-4-hydroxyphenyl) propionyl] propionohydrazide and salicylic acid derivatives such as 3-(N-salicyloyl) amino-1,2,4-triazole. The metal deactivator preferably contains salicylic acid derivatives such as 3-(N-salicyloyl) amino-1,2,4-triazole.

The present composition preferably contains (G) the metal deactivator in an amount of 1 to 10 parts by mass, and more preferably in an amount of 1 to 5 parts by mass, with respect to 100 parts by mass of the total amount of the resin compounds (A), (B), and (C). When the amount is within the above-described range, the present composition has excellent antioxidant property and is suppressed to cause blooming.

(H) A lubricant is not particularly limited, and either an internal lubricant or external lubricant may be used as the lubricant. Examples of the lubricant include hydrocarbons such as liquid paraffin, paraffin wax, and polyethylene wax; higher alcohols; fatty acids such as stearic acid oleic acid, and erucic acid; fatty acid amides such as stearic acid amide, oleic acid amide, and erucic acid amide, methylenebisstearic acid amide; alkylene fatty acid amides such as ethylenebisstearic acid amide; metal soaps such as metal stearates; and ester lubricants such as stearic acid monoglyceride, stearyl stearate, and hardened oil. From a viewpoint of compatibility with the resin components, derivatives of fatty acids such as erucic acid, oleic acid, and stearic acid, or polyethylene-based wax are preferably used as the lubricant.

The present composition preferably contains the lubricant in an amount of 1 to 10 parts by mass, and more preferably in an amount of 1 to 5 parts by mass, with respect to 100 parts by mass of the total amount of the resin components (A), (B), and (C). When the amount is within the above-described range, the present composition has a sufficient lubrication effect.

As a component (I), a combination of (I-1) zinc oxide and an imidazole compound or (I-2) zinc sulfide is used as additive agents for improving heat resistance and long-term heat resistance. Either the addition of (I-2) only the zinc sulfide or (I-2) the combination of the zinc oxide and the imidazole compound can provide a similar effect.

The above-described zinc oxide is, for example, obtained by adding a reducing agent such as a coke to a zinc ore and oxidizing zinc vapor generated by firing with air, or by using zinc sulfate or zinc chloride as a raw material. A method to manufacture the zinc oxide is not particularly limited, any methods can be used for producing the zinc oxide. Further, zinc sulfide manufactured by a known method can be used. An average particle sizes of the zinc oxide and the zinc sulfide is preferably 3 μm or smaller, and more preferably 1 μm or smaller. When the average particle size of the zinc oxide and the zinc sulfide decreases, interface strength with the resin increases and dispersibility also increases.

The above-described imidazole compound is preferably a mercaptobenzimidazole. Examples of the mercaptobenzimidazole include 2-mercaptobenzimidazole, 2-mercaptomethylbenzimidazole, 4-mercaptomethylbenzimidazole, 5-mercaptomethylbenzimidazole, and zinc salts of these compounds. 2-mercaptobenzimidazole and its zinc salt are particularly preferable because the compounds have high melting points and cause little sublimation during mixing.

The present composition preferably contains, as the components(I), (I-1) the zinc oxide and the imidazole compound each in an amount of 1 to 15 parts by mass or (I-2) the zinc sulfide in an amount of 1 to 15 parts by mass, with respect to 100 parts by mass of the total amount of the resin components (A), (B), and (C). When the amounts of the components are within the above-described ranges, the present composition has excellent heat resistance and long-term heat resistance, and the particles are less likely to aggregate and have excellent dispersibility.

The composition for wire coating material according to the embodiment of the present invention may contain various additives as far as the additives do not impair the object of the present invention. Examples of the additives include an inorganic filler, a pigment, and a silicone oil.

For example, when an inorganic filler is added to the present composition, the hardness of the resin can be adjusted by addition of the filler, and fusion resistance and heat deformation resistance of the composition can be improved by addition of the filler. The present composition preferably contains the inorganic filler in an amount of 30 parts by mass or smaller from a viewpoint of the resin strength with respect to 100 parts by mass of the total amount of the resin components (A), (B), and (C).

The composition for a wire coating material according to the present invention can be prepared by mixing the components (A) to (E) and the various additives which are added as needed, and by kneading the mixture with a twin-screw extruder, etc. When the silane-grafted polyolefin and the crosslinking catalyst are mixed, the crosslinking reaction proceeds due to moisture in the air. Thus, from a viewpoint of preventing the crosslinking reaction and other unintended reactions during the saving of the composition, the components are preferably mixed immediately before an electric wire is coated with the composition. As such a method, it is preferable to prepare a silane-grafted batch, a flame-retardant batch, and a crosslinking catalyst batch separately in advance and pelletize them.

The silane-grafted batch is a batch containing (A) the silane-grafted polyolefin. The flame-retardant batch is a batch containing (B) the unmodified polyolefin, (C) the modified polyolefin, and (D) the flame retardant. The crosslinking catalyst batch is a batch containing (E) the crosslinking catalyst and the binder resin. Any of the silane-grafted batch, the flame-retardant batch, and the crosslinking catalyst batch may contain the components (F) to (I) and various additives which are added as needed as far as the object of the present invention is not impaired.

An insulated wire and a wiring harness according to embodiments of the present application will be described next.

In the insulated wire according to the embodiment of the present invention, a conductor is coated with an insulating layer made of a coating material for the electric wire (also simply referred to as a coating material) obtained by crosslinking of the above-described composition for electric wire coating material. The conductor of the insulated wire is not particular limited by the conductor diameter and conductor material, and thus, the conductor can be appropriately selected depending, for example, on the application of the insulated wire. Examples of the material of the conductor include copper, copper alloy, aluminum, and aluminum alloy. From a viewpoint of reducing the weight of the electric wire, the conductor is preferably made of aluminum or an aluminum alloy. The insulating layers of the coating material for the electric wire may have a single layer or multiple layers consisting of two or more layers.

In the insulated wire according to the embodiment of the present invention, the degree of crosslinking of the crosslinked coating material is preferably 50% or more when expressed as a gel fraction, and more preferably 60% or more, from a viewpoint of heat resistance. The gel fraction of the coating material for the insulated wire is in general, used as an index of a crosslinked state for an electric wire. The gel fraction of the coating material can be measured in accordance with JASO D608-92.

In order to manufacture the insulated wire according to the embodiment of the present invention, the above-described silane-grafted batch, flame-retardant batch, and crosslinking catalyst batch may be heated and kneaded by, for example, an ordinary kneading machine such as a banbury mixer, a pressure kneader, a kneading extruder, a twin-screw extruder, or a roll. Then, the composition may be extruded by an extrusion molding apparatus to coat the conductor outer periphery, and then may be crosslinked.

The coating material is crosslinked in a method of exposing a coating layer of the coated wire to vapor or water. Crosslinking reaction is preferably accomplished at a temperature within a range of room temperature to 90° C., and in a period within 48 hours, and more preferably accomplished at a temperature within a range of 50 to 80° C., and in a period within 8 to 24 hours.

A wiring harness according to the embodiment of the present invention contains the above-described insulated wire. The wiring harness may be a single wire bundle in which only the above-described wires are bundled together, or a mixed wire bundle in which the above-described insulated wires and other insulated wires are bundled together in a mixed state. The wire bundle composes the wiring harness while the wire bundle is bundled with a wire harness protecting material such as a corrugated tube and a binding material such as an adhesive tape.

The insulated wire according to the embodiment of the present invention can be used as various types of electric wires in automobiles, devices, information communication systems, electric power supply systems, ships, aircrafts, etc. Particularly, it can be suitably used as an electric wire for automobiles.

A wire for automobile is classified in A to E classes in accordance with international standard ISO 6722 depending on its allowable heat resistance temperature. Since the insulated wire according to the embodiment of the present invention is made of the above-described wire coating material, the insulated wire has excellent heat resistance and is ideal for a battery cable applied to high voltage. Thus, the insulated wire according to the embodiment of the present invention can have the properties of class C having heat resistance temperature of 125° C., or class D having heat resistance temperature of 150° C.

The embodiments of the present invention have been described specifically but the present invention is no way restricted to the embodiments described above but can be modified variously within a range not departing from the gist of the present invention.

Example

The embodiments of the present invention are to be described by way of examples but the present invention is not restricted to the examples.

[(A) Silane-Grafted Polyolefin]

Silane-grafted polyolefins (Silane-grafted PE1 to PE3 and Silane-grafted PP1) were prepared by kneading dry blended materials containing polyolefins shown below (i.e., base PE1 to PE5 and base PP1) as base polyolefins at 140° C. with a single screw extrusion kneader having an inner diameter of 25 mm. The dry blended materials further contained, with respect to 100 parts by mass of each polyolefin, vinyltrimethoxysilane ("KBM1003" manufactured by Shin-Etsu Chemical Co., Ltd.) in an amount of 1.5 parts by mass and dicumyl peroxide ("PERCUMYL D" manufactured by NOF CORPORATION) in an amount of 0.15 parts by mass.

A crosslinking catalyst ("Linkron LZ015H" manufactured by Mitsubishi Chemical Corporation) in an amount of 5 parts by mass was added to 100 parts by mass of the above-described silane-grafted polyolefins. The materials were kneaded at 200° C. for 5 minutes with "LABO PLASTOMILL" manufactured by Toyo seiki CO., LTD., and then the obtained mass-like substances were compressed and pressed at 200° C. for 3 minutes to mold the materials into sheets having a thickness of 1 mm. After the obtained molded sheets were crosslinked for 12 hours in a thermostatic bath at a temperature of 60° C. and a humidity of 95%, the sheets were dried at room temperature for 24 hours.

A test piece having a weight of about 0.1 g was taken from each of the obtained molded sheets, and then the test piece was immersed in xylene at a temperature of 120° C. for 20 hours, and then taken out of the xylene. The test piece taken out was dried at 100° C. for 6 hours, and then the dried test piece was weighed. The mass of the silane-grafted polyolefin after the immersion in xylene expressed in a percentage with respect to the mass before immersion in xylene was defined as a gel fraction. The gel fraction is shown in Table 1.

Gel fraction %=(the mass after immersion in xylene/the mass before immersion in xylene)×100

The crosslinking catalyst in the crosslinking catalyst batch was assumed to be contained in the crosslinked product even after immersion in xylene. Further, the gel fraction was calculated on the assumption that the whole amount of the binder resin was eluted in xylene after immersion in xylene.

For the base polyolefins composing the silane-grafted polyolefins, the resin described below were used. The density, melting point, melt flow rate (MFR) at 190° C. under a load of 2.16 kg, flexural modulus, and Shore A hardness of each of the base polyolefins in the ungrafted state, and the gel fraction of the base polyolefin after the silane-grafting are shown in table 1.

Base PE1: "INFUSE9107" manufactured by Dow Elastomers Co., Ltd.
Base PE2: "INFUSE9807" manufactured by Dow Elastomers Co., Ltd.
Base PE3: "INFUSE9507" manufactured by Dow Elastomers Co., Ltd.
Base PE4: VLDPE prototype
Base PE5: "ENGAGE7467" manufactured by Dow Elastomers Co., Ltd.,
Base PE6: "NOVATECH EC9" manufactured by Japan Polypro Co., Ltd.

presented in each parenthesis (i.e., maleic anhydride, glycidyl methacrylate, and methyl methacrylate) with the polyolefins. Thus, functional groups corresponding to the reacted compounds were introduced to the polyolefins. Some of the ester groups, acid anhydride groups, etc., may exist in the form of a carboxy group through hydrolysis.

Modified PE1: "Modic AP512P" (Maleic anhydride modified) manufactured by Mitsubishi Chemical Corporation
Modified PE2: "Bond First E" (Glycidyl methacrylate modified) manufactured by Sumitomo Chemical Co., Ltd.
Modified PE3: "Acryft WH102" (Methyl methacrylate modified) manufactured by Sumitomo Chemical Co., Ltd.
Modified PP1: "Admer QB550" (Maleic anhydride modified) manufactured by Mitsui Chemicals Co., Ltd.

Components other than the above-described components were as follows.

[(D) Flame Retardant]
Metal hydroxide 1: "KISMA 5" (Magnesium Hydroxide) manufactured by Kyowa Chemical Industry Co., Ltd.

TABLE 1

| | | Silane-grafted PE1 | Silane-grafted PE2 | Silane-grafted PE3 | Silane-grafted PE4 | Silane-grafted PE5 | Silane-grafted PP1 |
|---|---|---|---|---|---|---|---|
| Base polyolefin | | Base PE1 | Base PE2 | Base PE3 | Base PE4 | Base PE5 | Base PP1 |
| Density | g/cm$^3$ | 0.866 | 0.866 | 0.866 | 0.850 | 0.862 | 0.920 |
| Melting Point | ° C. | 121 | 118 | 119 | <30 | 34 | 160 |
| MFR | g/10 min. | 1 | 15 | 5 | 2.5 | 1 | 0.5 |
| Flexural Modulus | MPa | 7 | 8 | 4 | 3 | 4 | 1000 |
| Shore A Hardness | — | 60 | 55 | 60 | 50 | 52 | 90< |
| Gel Fraction | % | 92 | 91 | 94 | 96 | 95 | 58 |

[(B) Unmodified Polyolefin]
The resins presented below were used as unmodified polyolefins (unmodified PE1 to PE4). Table 2 shows the density of each polyolefin.

Unmodified PE1: "ENGAGE 7467" manufactured by Dow Elastomers Co., Ltd.
Unmodified PE2: "ENGAGE 7256" manufactured by Dow Elastomers Co., Ltd.
Unmodified PE3: "INFUSE 9107" manufactured by Dow Elastomers Co., Ltd.
Unmodified PE4: "NOVATEC HDHY 331" manufactured by Japan Polypro Co., Ltd.
PP elastomer: "NEWCON NAR 6" manufactured by Japan Polypro Co., Ltd.

Metal hydroxide 2: "Magnifin H10" (Magnesium Hydroxide) manufactured by Albemarle Corporation Metal hydroxide 3: "C305" (Aluminum Hydroxide) manufactured by Sumitomo Chemical Co., Ltd.

Bromine flame retardant 1: "SAYTEX8010" (Ethylenebispentabromobenzene) manufactured by Albemarle Corporation Bromine flame retardant 2: "SAYTEXBT-93" (Ethylenebistetrabromophthalimide) manufactured by Albemarle Corporation Antimony trioxide: MSW grade manufactured by Yamanaka & Co., Ltd.

TABLE 2

| | | Unmodified PE1 | Unmodified PE2 | Unmodified PE3 | Unmodified PE4 | PP Elastomer |
|---|---|---|---|---|---|---|
| Density | g/cm$^3$ | 0.862 | 0.885 | 0.866 | 0.951 | 0.890 |
| Melting Point | ° C. | 34 | 70 | 121 | 131 | 140 |
| MFR | g/10 min. | 1 | 2.5 | 1 | 1 | 2.2 |
| Flexural Modulus | MPa | 4 | 30 | 7 | 1050 | 550 |

[(C) Modified Polyolefin]
The resins presented below were used as the modified polyolefins (modified PE1 to PE3, and modified PP1). The modified PE1 to PE3 contained polyethylene as base polyolefin, while the modified PP1 contained polypropylene as base polyolefin. The below-described polyolefins (i.e., modified PE1 to PE3, and modified PP1) respectively indicate resins prepared through reactions of the compounds

[(E) Crosslinking Catalyst]
Crosslinking catalyst batch: "LINKLON LZ082" manufactured by Mitsubishi Chemical Corporation
[(F) Antioxidant]
Antioxidant 1: "Irganox1010" manufactured by BASF JAPAN Co., Ltd.
Antioxidant 2: "Irganox3114" manufactured by BASF JAPAN Co., Ltd.

[(G) Metal Deactivator]

Metal deactivator: "CDA-1" manufactured by ADEKA CORPORATION

[(H) Lubricant]

Lubricant: "ALFLOW P-10" (Erucic acid amide) manufactured by NOF CORPORATION

[Component (I)]

Zinc Oxide: manufactured by HAKUSUI TECH. Co., Ltd.

Imidazole compound: "ANTAGE MB" (2-mercaptobenzimidazole) manufactured by Kawaguchi Chemical Industry Co., Ltd.

Zinc sulfide: "SACHTOLITH HD-S" manufactured by Sachtleben Chemie Gmbh (Preparation of Silane-Grafted Batch)

The silane-grafted polyolefins were prepared as silane-grafted batches in the form of pellets.

(Preparation of Crosslinking Catalyst Batch)

"Linklon LZ082" manufactured by Mitsubishi Chemical Corporation, which was supplied as pellets in advance, was used as the crosslinking catalyst batch. "Linklon LZ082" contains polyethylene (density: 0.91 g/cm$^3$) as a binder resin in an amount of 99 parts by mass and a tin compound as a crosslinking catalyst in an amount of 1 part by mass.

(Preparation of Flame Retardant Batch)

Flame retardant batches were prepared by kneading the components shown in Tables 3 and 4 except for the silane-grafted polyolefin, the crosslinking catalyst, and the binder resin at 200° C. for 0.1 to 2 min with a twin-screw extruder, to sufficiently disperse the components. Then the obtained materials were pelletized to form the flame retardant batches.

(Production of Insulated Wire)

The silane-grafted batches, the flame retardant batches, and the cross-linking catalyst batches prepared in the compounding ratios shown in Tables 3 and 4 were mixed in a hopper of a extruder, and then were extruded and molded with the extruder set at the temperature of 200° C. In the extrusion process, insulators having a thickness of 0.7 mm was extruded on conductors having an outer diameter of 2.4 mm to form covering materials (covering outer diameter: 3.65 mm). Then, the covering materials were crosslinked for 24 hours in a thermostat at a temperature of 65° C. and a humidity of 95%. Thus, insulated wires were obtained.

The obtained compositions for the wire coating material and the insulated wires were tested and evaluated in fusion resistance, ISO flame retardancy, gel fraction, ISO long-term heat resistance, ISO wear resistance, flexibility, and ISO heat deformation. The evaluation results are shown in Tables 4 and 5. Each test method and evaluation criterion will be described below.

(Fusion Resistance)

Each of the above-prepared insulated wire before crosslinking which has the coating material formed by extrusion of the insulator on the conductor was used as a test sample. The uncrosslinked insulated wire was wound around an iron reel having an outer diameter of 30 mm for 300 m. Then, the insulated wire was crosslinked in a thermostatic bath at a temperature of 65° C. and a humidity of 95% for 24 hours. The insulated electric wire after crosslinked was rewound on a plastic reel, and the presence of fusion marks that appeared when a part of the wire was fused with another part of the wire was evaluated by visual observation. When no fusion marks was observed, the insulated wire was evaluated as "passed". On the other hand, when a fusion mark was observed, the insulated wire was evaluated as "failed".

(ISO Flame Retardancy)

Flame retardancy of each the crosslinked insulated wire was evaluated in accordance with ISO 6722. When fire was extinguished within 70 seconds, the insulated wire was evaluated as "passed". On the other hand, when fire was not extinguished within 70 seconds, the insulated wire was evaluated as "failed".

(Gel Fraction)

Gel fraction of each insulated wire was measured in accordance with JASO D608-92. A sample having a weight of about 0.1 g was taken from the coating material of the crosslinked insulated wire. The sample was weighed. The sample was put in a test tube, and then 20 mL of xylene was added into the test tube. The test tube was heated in an oil bath at 120° C. for 24 hours. Then, the sample was taken out from the test tube, was dried in a dryer at 100° C. for 6 hours, and then left to cool to room temperature. After that, the sample was weighted. The gel fraction was obtained by expressing the mass of the sample after the test in percentage, with respect to the mass before the test. When the gel fraction was 50% or more, the sample was evaluated as "passed", and further, when the gel fraction was 60% or more, the sample was evaluated as "excellent". On the other hand, the gel fraction was less than 50%, the sample was evaluated as "failed".

(ISO Long-Term Heat Resistance)

Long-term heat resistance of the crosslinked material was evaluated in accordance with ISO 6722. The crosslinked insulated wire was left for 3000 hours in a thermostatic bath at 125° C. or 150° C., and then voltage resistance test at 1 kV for 1 min. was performed. When the insulated wire did not cause dielectric breakdown in the voltage resistance test after left in the thermostatic bath at 125° C., the wire was evaluated as "passed". On the other hand, when the insulated wire caused dielectric breakdown in the test, the wire was evaluated as "failed". Further, when the insulated wire did not cause dielectric breakdown in the voltage resistance test after left in the thermostatic bath at 150° C., the wire was evaluated as "excellent".

(ISO Wear Resistance)

Wear resistance of the crosslinked insulated wire was evaluated in accordance with ISO 6722. The insulated wire was pressed by an iron wire having an outer diameter of 0.45 mm with a load of 7 N, and the iron wire was reciprocated at the speed of 55 times/min. The numbers of reciprocation until the iron wire and the copper conductor were electrically conducted to each other was measured. When the numbers of reciprocation was 700 or more, the insulated wire was evaluated as "passed", when the numbers of reciprocation was 1000 or more, the insulated wire was evaluated as "excellent", and when the numbers of reciprocation was less than 700 times, the insulated wire was evaluated as "failed".

(Flexibility)

With reference to JIS K7171, three-point bending flexibility of each insulated wire was evaluated using an autograph AG-01 manufactured by Shimadzu Co., Ltd. The crosslinked insulated electric wire was cut into a length of 100 mm. Three pieces of the wire were arranged side by side, and the terminal ends of the wires were fixed to each other with a polyvinyl chloride tape, to form a test piece. The test piece was set on a jig having a pair of columns having a distance of 50 mm in between. Then, the sample piece was pressed at the center of the columns from the upper direction at a speed of 1 ram/min. During the pressing, the maximum load was measured.

When the maximum load was 3N or smaller, the insulated wire was evaluated as "passed", and further, when the maximum load was 2N or smaller, the insulated wire was evaluated as "excellent". On the other hand, when the maximum load was larger than 3N, the insulated wire was evaluated as "failed".

(ISO Heat Deformation)

Heat deformation of the crosslinked insulated wire was evaluated in accordance with ISO 6722. The crosslinked insulated wire was pressed with a blade having a tip width of 0.7 mm at a load of 190 g, and was left in a thermostatic bath at 150° C. for 4 hours in that state. Then, voltage resistance test for the insulated wire was performed at 1 kV for 1 min in a 1% salt solution. When the insulated wire did not cause dielectric breakdown in the voltage resistance test, the wire was evaluated as "passed". On the other hand, when the insulated wire caused dielectric breakdown in the test, the wire was evaluated as "failed". When the wire was evaluated as "passed", a remaining portion of the insulation coating was evaluated. The remaining portion was calculated as a ratio of a thickness of the insulation coatings in terms of a cumulative thickness in one direction (for example, in the case where the thickness in one side was 0.7 mm, the cumulative thickness was 0.7×2=1.4 mm) after the removal from the thermostatic bath with respect to thickness before the introduction into the thermostatic bath. When the remaining portion was 75% or more, the insulated wire was evaluated as "excellent".

TABLE 3

|  | Example 1 | Example 2 | Example 3 | Example 4 | Example 5 | Example 6 | Example 7 |
|---|---|---|---|---|---|---|---|
| Silane-grafted PE1 | 60 |  |  | 60 |  |  | 85 |
| Silane-grafted PE2 |  |  | 60 |  |  | 70 |  |
| Silane-grafted PE3 |  | 60 |  |  | 60 |  |  |
| Silane-grafted PE4 |  |  |  |  |  |  |  |
| Silane-grafted PE5 |  |  |  |  |  |  |  |
| Silane-grafted PE6 |  |  |  |  |  |  |  |
| Unmodified PE1 |  | 30 |  |  |  | 20 | 10 |
| Unmodified PE2 | 30 |  |  | 30 | 30 |  |  |
| Unmodified PE3 |  |  | 30 |  |  |  |  |
| Unmodified PE4 |  |  |  |  |  |  |  |
| PP Elastomer | 5 |  |  | 5 |  |  |  |
| Modified PE1 | 5 |  |  | 5 |  |  | 5 |
| Modified PE2 |  |  | 10 |  |  |  |  |
| Modified PE3 |  |  |  |  | 10 |  |  |
| Modified PP1 |  | 10 |  |  |  | 10 |  |
| Metal Hydroxide 1 | 70 |  |  |  |  |  |  |
| Metal Hydroxide 2 |  | 70 |  |  |  | 30 | 20 |
| Metal Hydroxide 3 |  |  | 80 |  |  |  |  |
| Bromine Flame Hydroxide 1 |  |  |  | 30 |  | 15 | 20 |
| Bromine Flame Hydroxide 2 |  |  |  |  | 15 | 10 |  |
| Antimony Trioxide |  |  |  | 10 | 5 | 10 | 10 |
| Antioxidant 1 | 2 | 3 | 3 |  | 1 | 2 | 1 |
| Anboxidant 2 |  |  |  | 3 | 1 | 2 | 1 |
| Metal Deactivator | 1 | 1 | 1 | 0.5 |  |  |  |
| Lubricant | 0.5 | 0.8 | 0.4 | 0.5 | 0.6 | 1 | 0.3 |
| Zinc Oxide |  |  |  | 10 |  |  |  |
| Imidazole Compound |  |  |  | 10 |  |  |  |
| Zinc Sulfide |  |  |  |  | 12 |  |  |
| Binder Resin | 4.95 | 4.95 | 4.95 | 4.95 | 4.95 | 4.95 | 4.95 |
| Crosslinking Catalyst | 0.05 | 0.05 | 0.05 | 0.05 | 0.05 | 0.05 | 0.05 |
| Total Amount | 178.5 | 179.8 | 189.4 | 169 | 169.6 | 165 | 137.3 |
| Fusion Resistance | P | P | P | P | P | P | P |
| ISO Flame Ratardancy Test | P | P | P | P | P | P | P |
| Gel Fraction | E | E | E | P | P | P | P |
| ISO Long-term Heat Resistance Test | P | P | P | E | E | P | P |
| ISO Wear Resistance Test | E | P | P | P | P | P | P |
| Flexibility | E | E | E | E | E | E | E |
| ISO Heat Deformation Test | E | P | E | E | E | E | P |

E: Excellent, P: Passed, F: Failed

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Silane-grafted PE1 |  |  |  |  |  | 60 |
| Silane-grafted PE2 |  |  |  | 60 |  |  |
| Silane-grafted PE3 |  |  |  |  |  |  |
| Silane-grafted PE4 | 60 |  |  |  |  |  |
| Silane-grafted PE5 |  | 60 |  |  | 60 |  |
| Silane-grafted PE6 |  |  | 60 |  |  |  |
| Unmodified PE1 |  | 30 |  |  |  | 35 |
| Unmodified PE2 | 30 |  |  |  |  |  |
| Unmodified PE3 |  |  | 30 |  | 30 |  |
| Unmodified PE4 |  |  |  | 30 |  |  |
| PP Elastomer | 5 |  |  |  |  |  |

TABLE 4-continued

| | Comparative Example 1 | Comparative Example 2 | Comparative Example 3 | Comparative Example 4 | Comparative Example 5 | Comparative Example 6 |
|---|---|---|---|---|---|---|
| Modified PE1 | 5 | | | 10 | | 5 |
| Modified PE2 | | | 10 | | | |
| Modified PE3 | | | | | | |
| Modified PP1 | | 10 | | | 10 | |
| Metal Hydroxide 1 | 70 | | | 70 | | |
| Metal Hydroxide 2 | | 70 | | | | |
| Metal Hydroxide 3 | | | 80 | | | 100 |
| Bromine Flame Hydroxide 1 | | | | | | |
| Bromine Flame Hydroxide 2 | | | | | | |
| Antimony Trioxide | | | | | | |
| Antioxidant 1 | 0.5 | 3 | 3 | | | 1 |
| Antioxidant 2 | | | | 3 | 0.5 | 1 |
| Metal Deactivator | 1 | 1 | 1 | 0.5 | 0.2 | |
| Lubricant | 0.5 | 0.8 | 0.4 | 0.5 | 1 | 0.3 |
| Zinc Oxide | | | | 10 | | |
| Imidazole Compound | | | | 10 | | |
| Zinc Sulfide | | | | | | |
| Binder Resin | 4.95 | 4.95 | 4.95 | 4.95 | 4.95 | — |
| Crosslinking Catalyst | 0.05 | 0.05 | 0.05 | 0.05 | 0.05 | — |
| Total Amount | 177 | 179.8 | 189.4 | 199 | 106.7 | 202.3 |
| Fusion Resistance | F | F | P | P | F | P |
| ISO Flame Retardancy Test | P | P | P | P | F | P |
| Gel Fraction | E | E | F | E | P | F |
| ISO Long-term Heat Resistance Test | P | P | P | E | P | F |
| ISO Wear Resistance Test | F | P | E | E | F | P |
| Flexibility | E | E | F | F | E | E |
| ISO Heat Deformation Test | E | P | F | E | F | F |

E: Excellent, P: Passed, F: Failed

As shown in Tables 3 and 4, the composition according to Comparative examples 1, 2, and 5 caused fusion after crosslinked since the melting points of the polyolefins constituting the silane-grafted polyolefins were lower than 80° C. The composition according to Comparative example 3 provided a low gel fraction and inferior flexibility since the density of the polyolefin constituting the silane-grafted polyolefin was higher than 0.890 g/cm³. The composition according to Comparative example 4 provided inferior flexibility since the density of the unmodified polyolefins was higher than 0.950 g/cm³. The composition according to Comparative example 5 had inferior flame retardancy since the composition did not contain the flame retardant. Further, the composition provided inferior wear resistance since the composition contained only an insufficient amount of the inorganic component. The composition according to Comparative example 6 was not crosslinked since the composition did not contain the crosslinking catalyst.

Meanwhile, the composition according to Examples, satisfying the constitution of the present invention, showed excellent flexibility, fusion resistance, and deformation resistance. Further, Examples 4 and 5 showed excellent long-term heat resistance containing the component (I), compared with the compositions which did not contain the component (I).

The invention claimed is:

1. A composition for a wire coating material comprising:
   (A) a silane-grafted polyolefin which is a polyolefin graft-modified with a silane coupling agent;
   (B) an unmodified polyolefin;
   (C) a modified polyolefin having one or more functional groups selected from the group consisting of a carboxy group, an ester group, an acid anhydride group, an amino group, and an epoxy group;
   (D) a flame retardant; and
   (E) a crosslinking catalyst,
   the polyolefin of (A) the silane-grafted polyolefin, in an ungrafted state, having a density of 0.855 to 0.890 g/cm³ and having a melting point of 80° C. or higher,
   (B) the unmodified polyolefin having a density of 0.855 to 0.950 g/cm³ and having a melting point of 65° C. or higher which is different from the melting point of the polyolefin of (A) the silane-grafted polyolefin.

2. The composition according to claim 1, wherein
   the polyolefin of (A) the silane-grafted polyolefin in the ungrafted state has the density of 0.865 to 0.880 g/cm³, a melt flow rate of 0.5 to 5 g/10 min. at 190° C. under a load of 2.16 kg, a Shore A hardness of 55 to 70, a flexural modulus of 3 to 50 MPa, and the melting point of 100° C. or higher, and
   (B) the unmodified polyolefin has a melt flow rate of 0.5 to 5 g/10 min. at 190° C. under a load of 2.16 kg, a flexural modulus of 3 to 200 MPa, and the melting point of 65° ° C. or higher which is lower than the melting point of the polyolefin of (A) the silane-grafted polyolefin.

3. The composition according to claim 1, wherein
   the amount of (A) the silane-grafted polyolefin is 30 to 90 parts by mass,
   the total amount of (B) the unmodified polyolefin and (C) the modified polyolefin is 10 to 70 parts by mass,
   (D) the flame retardant comprises with respect to 100 parts by mass of the total amount of the components (A), (B), and (C), at least either one of:
      (D-1) 10 to 100 parts by mass of a metal hydroxide; and
      (D-2) 10 to 40 parts by mass of a bromine flame retardant and 5 to 20 parts by mass of an antimony trioxide, and
   the amount of component (E) the crosslinking catalyst is 0.01 to 1 parts by mass with respect to 100 parts by mass of the total amount of the components (A), (B), and (C).

4. The composition according to claim 1, wherein the composition further comprises, with respect to 100 parts by mass of the total amount of the components (A), (B), and (C):
  (F) 1 to 10 parts by mass of an antioxidant;
  (G) 1 to 10 parts by mass of a metal deactivator; and
  (H) 1 to 10 parts by mass of a lubricant.

5. The composition according to claim 1, wherein the composition further comprises, with respect to 100 parts by mass of the total amount of the components (A), (B), and (C), either one of:
  (I-1) 1 to 15 parts by mass of a zinc oxide and 1 to 15 parts by mass of an imidazole compound; and
  (I-2) 1 to 15 parts by mass of a zinc sulfide.

6. The composition according to claim 1, wherein each of the polyolefin constituting (A) the silane-grafted polyolefin and (B) the unmodified polyolefin is one or more each selected from the group consisting of an ultra-low-density polyethylene, a linear-low-density polyethylene, and low-density polyethylene.

7. The composition according to claim 1, wherein (D) the flame retardant comprises both a metal hydroxide and a bromine flame retardant.

8. An insulated wire, comprising an electric wire coating material comprising a crosslinked product of the composition for a wire coating material according to claim 1.

9. A wiring harness, comprising the insulated wire according to claim 8.

* * * * *